Feb. 13, 1940.  A. E. GUY  2,189,952
ANTIBACKLASH ATTACHMENT FOR FISHING REELS
Filed Nov. 18, 1938

Inventor
Albert E. Guy

Patented Feb. 13, 1940

2,189,952

UNITED STATES PATENT OFFICE 2,189,952

ANTIBACKLASH ATTACHMENT FOR FISHING REELS

Albert E. Guy, Mount Vernon, N. Y.

Application November 18, 1938, Serial No. 241,254

1 Claim. (Cl. 242—84.5)

My invention relates to a device which is to be fastened to the frame of a fishing reel for the purpose of checking the momentum of the rotating parts at the end of the casting operation, when the weight attached to the end of the line having achieved its trajectory, the line ceases to travel outwards and, becoming slack on the reel, is caused by the continued rotation of the spool, due to acquired momentum, to unwind into a tangled mass. This most disturbing result is commonly said to be due to backlash. No one but an expert can cast successfully with an ordinary reel, and he does it through acquired skill by checking with his thumb the unwinding of the spool during the entire casting operation.

The object of my device is to provide means for controlling the reel so that a person without expert experience may use an ordinary fishing reel for casting, and concentrate attention on the sport without the dread of the annoyances of the backlash.

I attain this object by the use of the attachment fastened to a fixed part of the reel frame and which is illustrated in the accompanying drawing, in which—

Similar numerals refer to similar parts throughout the several views.

Figure 1:
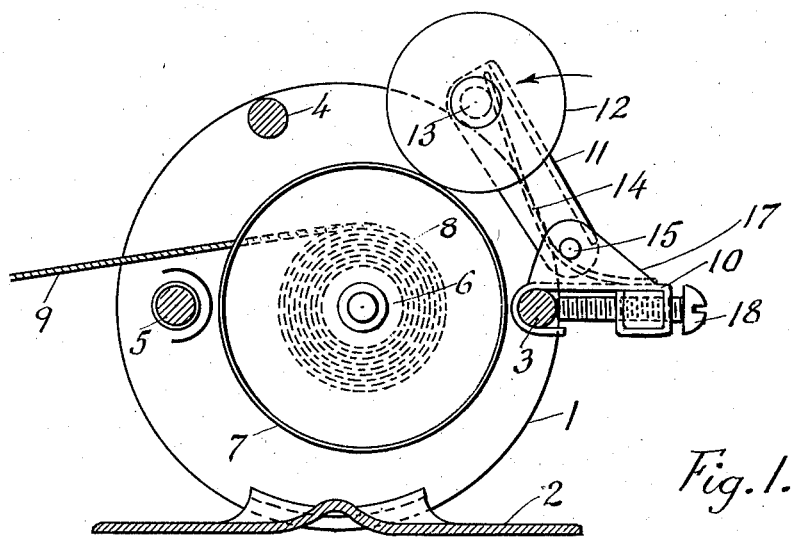
Figure 1 is an end view of a fishing reel as it appears after removal of one of the end plates.

The framework of the reel is constituted by two end plates 1, 1, maintained parallelly apart by the base plate 2, which is shaped for attachment to the handle of the pole, and by the two stay posts 3 and 4; 5 is a rotating screw spindle along which a carrier travels back and forth to direct the winding of the line on the spool; 6 is a shaft, or drum, on which are solidly mounted the two side plates 7—7 of the spool, each plate being shaped as a shallow pan; the ends of said shaft are of lesser diameter than the middle and rotate in bearings provided axially in the end plates; 8 is the mass of the line wound about the drum; 9 is the line extending towards the extremity of the fishing pole.

The attachment itself is shown here secured in place on one of the stay posts; it is composed of five main parts, viz: the clamping device 10, the oscillating arm 11, the roller 12, its spindle 13, and the spring blade 14. These parts are represented in assembly in Figure 2.

The clamping device 10 at one end grips around the post 3, and at the other, one or two screws 18 are threaded in and may be turned forward until contact is made with the post. With a final twist the screw pressure holds the post firmly against the curved end of the clamp and thus secures the whole device in position. The clamp is designed to be easily applied onto the post without interfering with any part of the reel, and it need not be displaced when the spool is removed from the framework for cleaning and lubricating. Its exact location, angularly, about the axis of the post is determined by trial to suit the required contact of the roller against the rim of the spool.

The two wings 16 and 17 hold the pivot pin 15, about which arm 11 oscillates. This arm is shown here in channel shape. Its upper end provides bearings to receive the roller spindle 13.

The roller may be made of leather, or of fiber board, or of some rubber compound, and it is mounted fixedly on its spindle.

Figure 2:
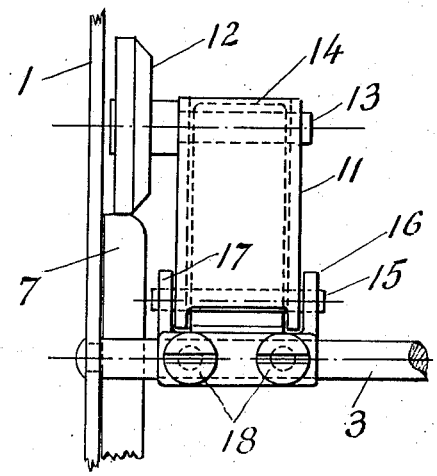
Figure 2 is a rear view of part of one side of the reel and of the attachment adjusted in place upon a stay post of the reel frame.

In Figure 2 the roller 12 is shown in contact with the spool rim 7; the post 3 is shown riveted to the end plate 1.

The spring blade 14 starts from the screw end of the clamp, passes under and against the pivot pin 15, bends and proceeds upwards until it passes the spindle 13, against the body of which it presses. The pressure exerted upon the spindle develops a friction which is the controlling factor of the reel during the cast, and particularly at the end of the cast when the line becomes slack and stops unwinding the spool. This pressure thus serves two purposes: the resulting friction upon the spindle controls the rotation of the spool, and the roller is forced into easy and elastic running contact with the rim, which is sufficient to arrest promptly the rotation of the moving parts at the end of the cast, in consequence of which the line has no tendency to further unwind and to become tangled up.

The clamping device has been described above as attached to one of the stay posts of the reel frame, which is a fixed part, but it can as well be suitably shaped for attachment to another fixed part, such as the end plate, for instance.

I have described the spring in the form of a flat blade as a simple device to illustrate the demonstration of the principle of the attachment. But, since the friction exerted upon the spindle is considered as the controlling factor of the reel, it is obvious that other forms of spring may be devised to produce the required pressure upon the spindle.

I claim:

The combination in an antibacklash attachment for a fishing reel, of a clamping device fixedly, but adjustably, attached to a part of the framework of the reel, of an oscillating arm pivoted at one end on said clamping device, of a roller rotated by contact with the rim of the spool, said roller being mounted fixedly upon a spindle received in bearings provided at the other end of said arm, of a spring blade pressing at one end upon the clamping device, at the other end upon the body of said roller spindle in such a direction as to maintain said roller against the rim of said spool, and at an intermediate part upon the pivot pin of said arm, all substantially as described.

ALBERT E. GUY.